June 16, 1942.  E. E. HOOD  2,286,986
BACKPEDALING BRAKE FOR VELOCIPEDES
Filed May 8, 1941
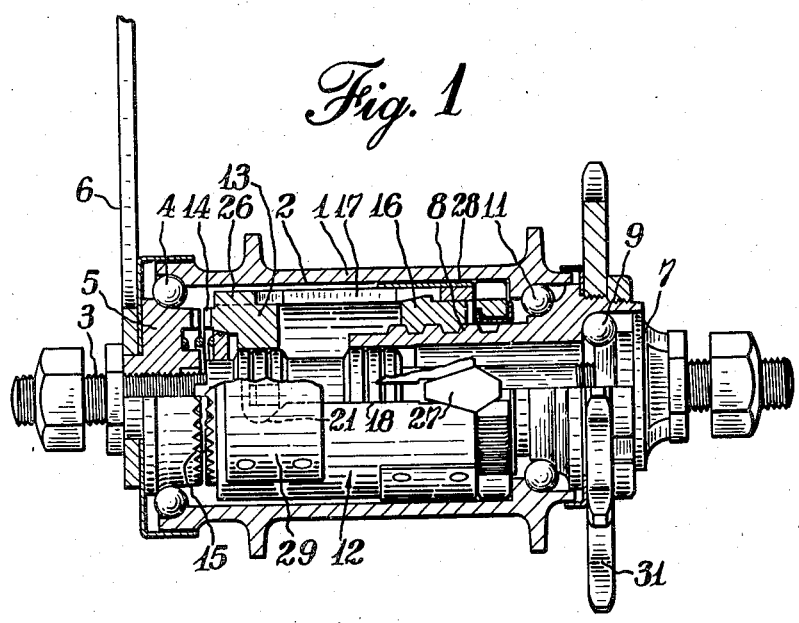
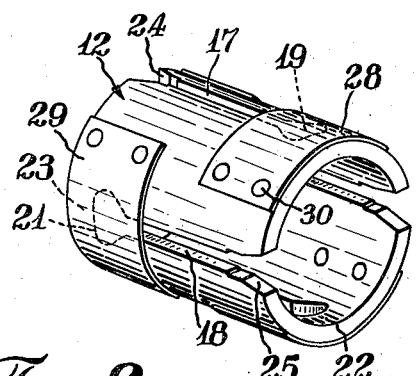
Witness:
Burr W. Jones
INVENTOR.
E. Elliott Hood
BY Clinton S. Janes.

Patented June 16, 1942

2,286,986

UNITED STATES PATENT OFFICE 2,286,986

BACKPEDALING BRAKE FOR VELOCIPEDES

E. Elliott Hood, Elmira, N. Y., assignor to Bendix Aviation Corporation, South Bend, Ind., a corporation of Delaware Application May 8, 1941, Serial No. 392,466

3 Claims. (Cl. 192—6)

The present invention relates to a backpedaling brake for velocipedes and more particularly to a brake of the expanding sleeve type such as shown in the patent to Christian 2,131,532.

In brakes of this type, the brake sleeve as commercially manufactured usually comprises a sleeve of suitable material such as steel which is provided with alternately arranged slots extending inwardly from each end in order to permit radial expansion of the sleeve. Longitudinally extending brass shoes are commonly attached to the periphery of the sleeve between the slots to form the friction surfaces for engaging with the interior of the wheel hub.

Due to the warping of the surface of the sleeve when it is expanded, it is difficult to secure full surface engagement between the brake shoes and the interior of the hub, so that the brake shoes are sometimes subjected to localized wear with excessive pressures which may cause the brake shoes to glaze over or to be roughened and to have particles thereof torn away and deposited on the interior of the hub, thus detracting from proper braking action.

It is an object of the present invention to provide a novel backpedaling hub brake for velocipedes which is efficient and reliable in operation and economical in construction.

It is another object to provide such a device incorporating a brake member in the form of a slotted expansive sleeve having circumferentially arranged arcuate brake shoes.

It is a further object to provide such a device in which the brake shoes are arranged to reenforce the elastic portions of the sleeve intermediate the slots.

It is another object to provide such a device in which the brake shoes are mounted adjacent the ends of the sleeve in alternate overlapping relation.

Further objects and advantages will be apparent from the following description taken in connection with the accompanying drawing in which:

Fig. 1 is a side elevation partly broken away and in section of a backpedaling brake incorporating the present invention; and Fig. 2 is a detail in perspective of the brake sleeve with the circumferentially arranged shoes fixed thereon.

In Fig. 1 of the drawing there is illustrated a wheel hub 1 of usual type having a smooth cylindrical interior braking surface 2 and arranged to be mounted at one end on a fixed axle 3 by means of bearings 4 cooperating with a fixed anchor member 5 threaded on the axle and prevented from rotation by a torque arm 6.

A bearing member 7 is adjustably mounted on the opposite end of the axle 3 and supports a driving screw shaft 8 by means of bearings 9. Bearings 11 are arranged between the screw shaft 8 and the adjacent end of the hub 1 to form a rotatable support therefor.

A brake sleeve 12 is loosely mounted in the interior of the hub, being supported at one end by an expanding member 13 having clutch teeth 14 adapted to engage corresponding teeth 15 in the anchor member 5 to prevent rotation of the expanding member and brake sleeve during the braking operation. The opposite end of the sleeve 12 is supported by a second expanding member 16 in the form of a nut threaded on the screw shaft 8. The sleeve 12 is formed as best shown in Fig. 2 with longitudinal slots 17 and 18 extending inwardly from its ends and having enlargements 19 and 21 at their closed ends so as to form elastic portions 22 and 23 which permit the sleeve to expand outwardly. The open ends of the slots 17 and 18 are preferably flared as shown at 24 and 25, and wedge members 26 and 27 (Fig. 1) formed on the expanding members 13 and 16 respectively are arranged to enter said flared portions to expand the sleeve.

According to the present invention, arcuate brake shoes 28 and 29 of suitable material such as brass are fixedly mounted in any preferred manner on the brake sleeve 12 adjacent the ends thereof in position to bridge the enlarged portions 19 and 21 of the slots 17 and 18 and to overlie the elastic portions 22 and 23 of the sleeve. As here shown, the brake shoes are attached to the sleeve by means of rivets 30 located in the ends of the shoes and traversing the sleeve. The shoes are thus arranged to be moved substantially radially into engagement with the interior of the hub 1 when the sleeve is expanded, whereby substantially full surface contact of the shoes with the interior of the hub may be obtained. The shoes also tend to reenforce the sleeve to some extent and reduce the liability of fracture of the elastic portions 22 and 23 of the sleeve.

In operation, backward rotation of the screw shaft 8 by the operator by means of a sprocket 31 mounted thereon, causes the expanding nut 16 on the screw shaft to move to the left in Fig. 1, thus shifting the brake sleeve assembly to the left, causing the dental clutch 14, 15 to close, after which further movement of the nut 16 causes the sleeve to be expanded by the wedges 26 and 27 to bring the brake shoes into frictional engagement with the interior of the hub. In the braking operation, there is a certain amount of servo action due to the circumferential arrangement of the brake shoes since the braking force tends to cause the brake shoes to flatten themselves into engagement with the interior of the hub. This effect is not so pronounced, however, as to interfere with the release of the brake when the screw shaft 8 is rotated forwardly.

Although but one embodiment of the invention has been shown and described in detail, it will be understood that other embodiments are possible and various changes may be made in the design and arrangement of the parts without departing from the spirit of the invention as defined in the claims appended hereto.

What is claimed is:

1. In a backpedaling brake for velocipedes, a cylindrical hub, a cylindrical brake sleeve mounted therein having overlapping longitudinal slots formed therein extending alternately from each end thereof, brake shoes fixed to the sleeve adjacent the ends thereof covering the closed ends of the slots so as to reenforce the points of flexure of the sleeve, and means for preventing rotation of the sleeve and expanding it to bring the shoes into frictional engagement with the hub.

2. In a backpedaling brake for velocipedes, a cylindrical hub, an expansible brake sleeve mounted therein having overlapping longitudinal slots formed therein extending alternately from each end thereof to points near the opposite end, arcuate brake shoes fixed to the sleeve adjacent the ends thereof covering the closed ends of the slots so as to reenforce the points of flexure of the sleeve, anchoring means for the sleeve, and wedge means adapted to enter the open ends of thes slots and expand the sleeve to cause the brake shoes to bear on the interior of the hub.

3. A hub brake for velocipedes including a cylindrical barrel, a cylindrical sleeve therein, anchoring means for the sleeve, said sleeve being provided with alternately arranged quadrantally spaced longitudinal slots slightly shorter than the sleeve, forming substantially hemicylindrical expansive portions at its ends; and circumferentially extending brake shoes fixed on the hemicylindrical portions of the sleeve covering the closed ends of the slots and engageable without substantial warping with the interior of the hub, thereby providing cylindrical braking surfaces for the hub.

E. ELLIOTT HOOD.